United States Patent [19]

Rose

[11] Patent Number: 4,972,909

[45] Date of Patent: Nov. 27, 1990

[54] PLASTIC MOLDED HORSESHOE AND METHOD OF MANUFACTURE

[75] Inventor: Allen J. Rose, Muskego, Wis.

[73] Assignee: Rose Plastics & Machinery, Inc., Milwaukee, Wis.

[21] Appl. No.: 300,372

[22] Filed: Jan. 23, 1989

[51] Int. Cl.⁵ ............................................. A01L 5/00
[52] U.S. Cl. ................................. 168/4; 168/DIG. 1
[58] Field of Search ....................... 168/4, 24, DIG. 1

[56] References Cited

U.S. PATENT DOCUMENTS

| | | | |
|---|---|---|---|
| 2,622,685 | 12/1952 | Dixon | 168/13 |
| 3,469,631 | 9/1969 | Becker | 168/4 |
| 3,490,536 | 1/1970 | Hourlier | 168/4 |
| 3,494,422 | 2/1970 | Clark | 168/4 |
| 3,603,402 | 9/1971 | McDonnell | 168/4 |
| 3,957,120 | 5/1976 | Alletrux | 168/4 |
| 4,346,762 | 8/1982 | Tovim | 168/4 |
| 4,496,002 | 1/1985 | Jones | 168/4 |
| 4,585,068 | 4/1986 | Jungersen | 168/11 |
| 4,645,008 | 2/1987 | Benning | 168/11 |
| 4,690,222 | 9/1987 | Cameron | 168/4 |
| 4,765,412 | 8/1988 | Colonel | 168/15 |

OTHER PUBLICATIONS

"Plastic Horseshoes Combine Wear and Therapy," *Plastics Engineering,* Jan. 1987, p. 14.

*Primary Examiner*—Robert P. Swiatek
*Attorney, Agent, or Firm*—Robert T. Johnson

[57] ABSTRACT

This invention is to disclose and claim an open ended light weight molded plastic horseshoe having a core segment of 60% glass fiber reinforced polyurethane plastic molding compound, encapsulated in clear polyurethane having treads and caulks formed on the earth side of the horseshoe. The core segment provides the rigidity for the horseshoe while the encapsulating clear polyurethane provides cushioning and wear properties. The core segment has integrally molded button protrusions on the hoof side surface, the earth side surface, and on the inner and outer edges of the legs.

3 Claims, 3 Drawing Sheets

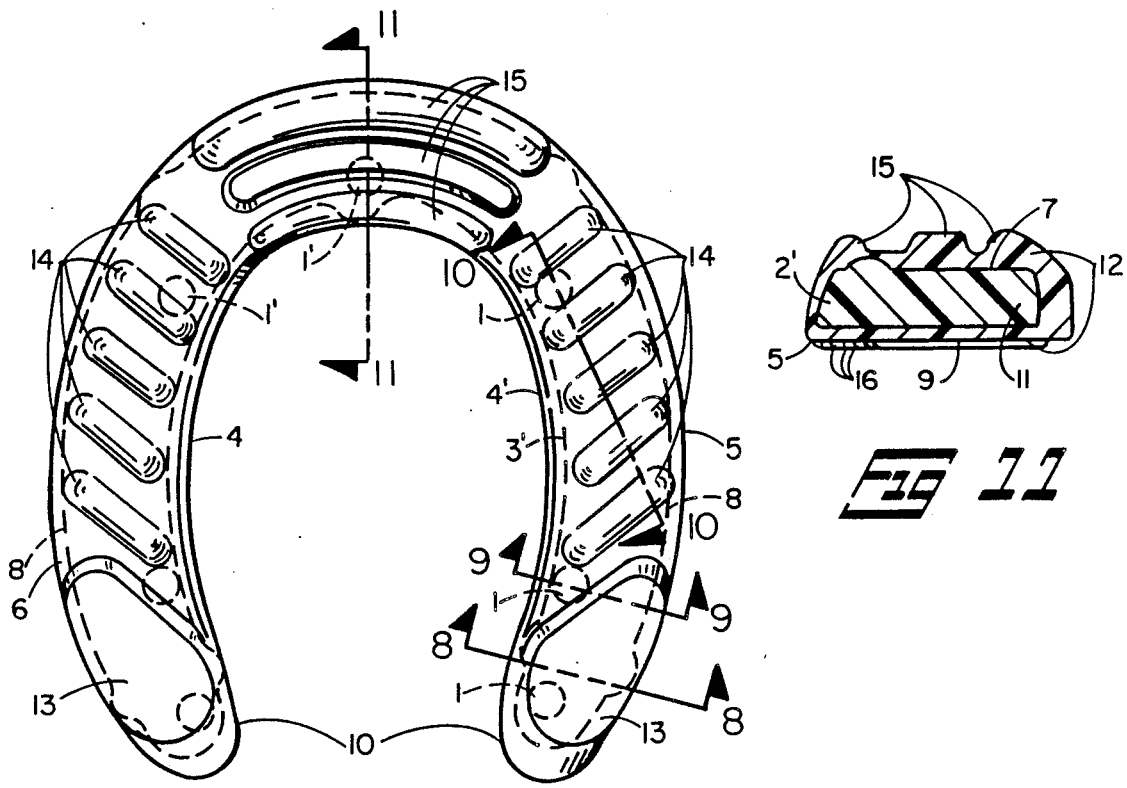
FIG 7
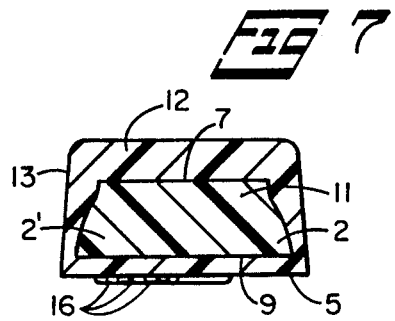
FIG 8
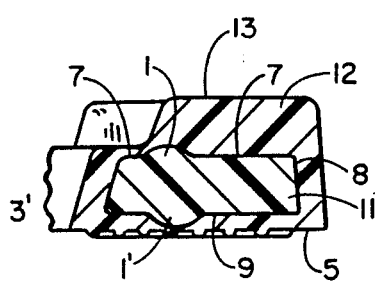
FIG 9
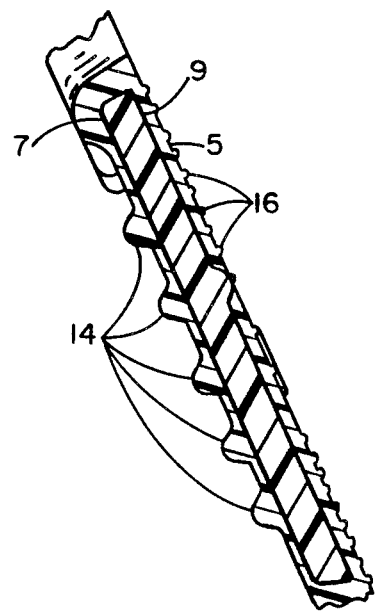
FIG 10
FIG 11

PLASTIC MOLDED HORSESHOE AND METHOD OF MANUFACTURE

BACKGROUND OF THE INVENTION

This invention pertains to horseshoes particularly the method of manufacture of non-metallic light-weight molded plastic horseshoes.

The problems encountered with metal horseshoes are well documented in the literature as noted in the patents cited in the background art noted below.

This invention discloses a method of manufacture of a plastic horseshoe which is light in weight, being about one quarter to one-sixth of the weight of an iron horseshoe, and further this plastic horseshoe is rigid, and formed to the hoof by sizing in manufacture, not flexing of the shoe.

Flexing of the shoe is stated for example in U.S. Pat. No. 4,496,002, where the shoe is fitted to the hoof by cold forming.

Many of the so called horseshoes molded of plastic have a closed heel end or are otherwise described as ring like plates, to prevent outward flexing of the hoof (see U.S. Pat. No. 3,490,536).

The molded plastic horseshoe of this invention is of such rigidity to not require a closed heel, but yet allow spread of the hoof heel, on the shoe hoof surface.

The horseshoe of this invention is mounted on a hoof by conventional nails driven through holes between the treads and at the toe caulk, and the head of the nails bottoming on the core segment.

BRIEF SUMMARY OF THE INVENTION

This invention is to disclose a molded plastic horseshoe, having a molded rigid core encapsulated in neat polyurethane. The molded rigid core material is a glass fiber filled thermoplastic polyurethane, with raised buttoms on areas of the core. This molded rigid core is then placed in a die, with the buttons serving to locate the core in the die to encapsulate the core. The encapsulating material being a neat polyurethane. The encapsulating die is of such design to form the caulks and treads as herein shown and described in the FIG. 7.

Further description of the invention can be stated as a non metallic light weight open end plastic double molded horseshoe, which is in contrast to closed end plastic horsehoes described in the background art.

In this disclosure, "caulk" is an alternate spelling of "calk", defined as a projectin extending downward, on the earth side, and located on the heels and toe of a horseshoe.

See "calk" in:

Websters Third New International Dictionary; Unabridged
Published by G & C Merriam
Springfield, Mass. (published 1967)

Also in this disclosure, the word "pimple" is synonymous with the word "button", in explanation of the horseshoe core segment.

BACKGROUND ART

Background patents pertaining to horseshoes are as follows:

U.S. Pat. No. 2,622,684 for Flexible Racing Horseshoe
  Disclosure is made in this patent of separated bodies of rubber mounted in U shaped legs of the horseshoe.
U.S. Pat. No. 3,469,631 for Plastic Horseshoe
  Disclosure is made in this patent of a resilient material and inwardly concave heel portion.
U.S. Pat. No. 3,490,536 for Plastic Horseshoe
  Disclosure is made in this patent of a fluid impervious upper plate joined to a high abrasive resistant lower plate. The plates comprising the shoe are ring-like plates.
U.S. Pat. No. 3,494,422 for Plastic Horseshoe And Method of Applying To Hoof.
  Disclosure is made in this patent of a plastic horseshoe applied without nails, and formed to the shape of the hoof.
U.S. Pat. No. 4,496,002 for Horseshoe
  Disclosure is made in this patent of a horseshoe molded of ultra high molecular weight ethylene polymers.
U.S. Pat. No. 4,585,068 for Horseshoe
  Disclosure is made in this patent of a two part horseshoe, one part is channel shaped upper part and exchangeable lower part fitting into the upper part.
U.S. Pat. No. 4,645,008 Racing Type Horseshoe
  This patent discloses a three piece horseshoe, with the earth contacting elastomeric plate held on to the base by means of screws.
U.S. Pat. No. 4,765,412 for Shock Relieving Horseshoe
  Disclosure is made in this patent of a horseshoe made of resilient material having a V shape for spring action between the hoof attached segment and the earth contacting segment.

None of the above reference patents disclose the invention described herein.

DESCRIPTION OF DRAWINGS

FIG. 7—Earth side of molded double compound horseshoe plan view of earth side.

FIG. 8 (section 8-8 of FIG. 7)—Cross section elevation view at heel caulk of molded double compound horseshoe.

FIG. 9 (section 9-9 of FIG. 7)—Cross section elevation view at partial heel caulk of molded double compound horseshoe.

FIG. 10 (section 10-10 of FIG. 7)—Cross section elevation view of mid portion caulk area of double compound horseshoe.

FIG. 11 (section 11-11 of FIG. 7)—Cross sectional elevation view of toe portion caulk area of double compound horseshoe.

Figure 1:
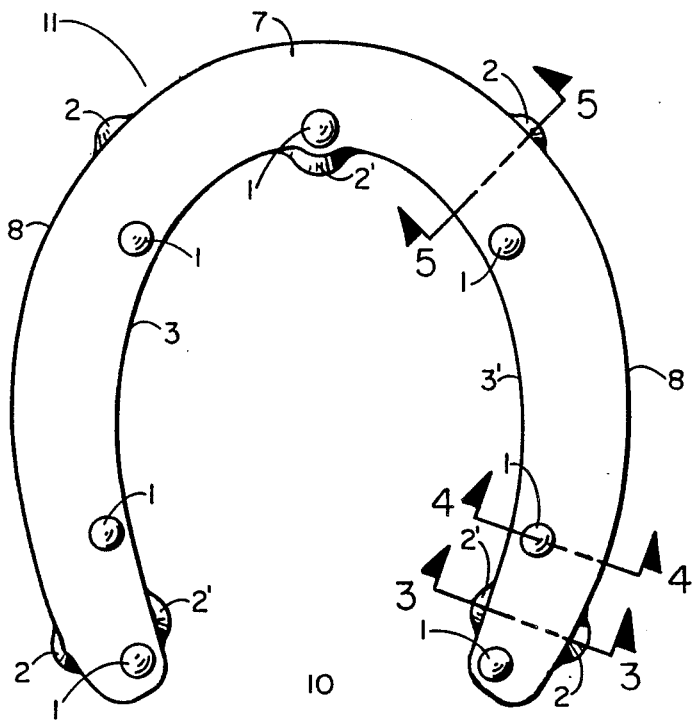
FIG. 1—Earth side of core of double molded horseshoe.

Nail holes are not shown as these are integral components of a horseshoe.

The nail holes are explained and described in the descritpion which follows.

DETAILED DESCRIPTION OF INVENTION

The reference patents describe horsehoes combining plastics and metal or plastics which include a cross piece across the heel of the shoe for rigidity.

The non-metallic open end horseshoe of this invention comprises a molded core 11 for a horseshoe and the core 11 has raised buttons 1 on the earth side of the horseshoe core and raised buttons 1' on the hoof side of the core. Buttons 2 and 2' are on the outer and inner edge of the core of the horseshoe 11. The buttons above referred to 1,1' and 2,2' are an integral part of the molded core of the horseshoe and are formed in the molding of this core.

This molded core 11, of the horseshoe described above, comprises a molding compound of 60% glass fiber in thermoplastic polyurethane such as compound PUGL-60-001 manufactured by Polymer Composites, Inc. of 5152 West Sixth Street, Winona, Minn. 55987.

A compound for the molded core would have the following typical physical properties:

| | |
|---|---|
| Tensile strength (psi) | 34,900 |
| Tensile modulus (psi) | 2,300,000 |
| Tensile elongation % | 1.9 |
| Flexural Strength (psi) | 59,500 |
| Flexural modulus (psi) | 2,400,000 |
| notched Izod .125" spec (ft. lb./in.) | 13.4 |
| Compressive strength (psi) | 29,300 |
| Heat distortion @ 264 psi °F. | 215 |
| Specific gravity | 1.76 |
| Hardness | 90 Shore D |

As can be seen, based on the physical properties, this is a very rigid material.

As the second step in fabrication or manufacture of the horseshoe of this invention, the molded core is completely encapsulated with clear or neat polyurethane having a hardness range of 65-90 (Shore A).

Encapsulation can be accomplished by placing the molded core 11 in a molding cavity of suitable dimension and the buttons 1,1' and 2,2' center the core 11 in the die so that encapsulation of the core is attained by conventional molding technique.

Referring now to FIGS. 8, 9, and 10, the clear or neat polyurethane 12 completely surrounds the core 11, and is formed into caulks 13, 15 and treads 14 of the horseshoe as well as the hoof side of the horseshoe. The inner edge 3,3' of molded core of horseshoe is shown in FIG. 9 as covered by the neat polyurethane 12.

In FIG. 8 are shown buttons 2 and 2' on outer and inner edge of core of horseshoe and these button ends extend to the outer surface of the neat polyurethane encapsulant material.

Legend 9 is the hoof side of core of the horseshoe, and as such the encapsulant material can be of a thinner dimension than on the earth side of the horseshoe.

The toe caulks 15 on the earth side of the horseshoe are shown in FIG. 11 and can be less than or equal to heel caulks 13 in thickness.

The hoof side of the horseshoe has corrugations 16 about 0.005" to 0.030" in height.

The legend 10 is to show the heel of the core of the horseshoe while 10' is to show the heel of the horseshoe.

Nail holes are provided by drilling between the treads and extending through the core segment and encapsulating neat polyurethane.

The tread segments 14 are on the earth side of the horseshoe and are located on each leg 5 and 6 (see FIG. 7).

Figure 2:
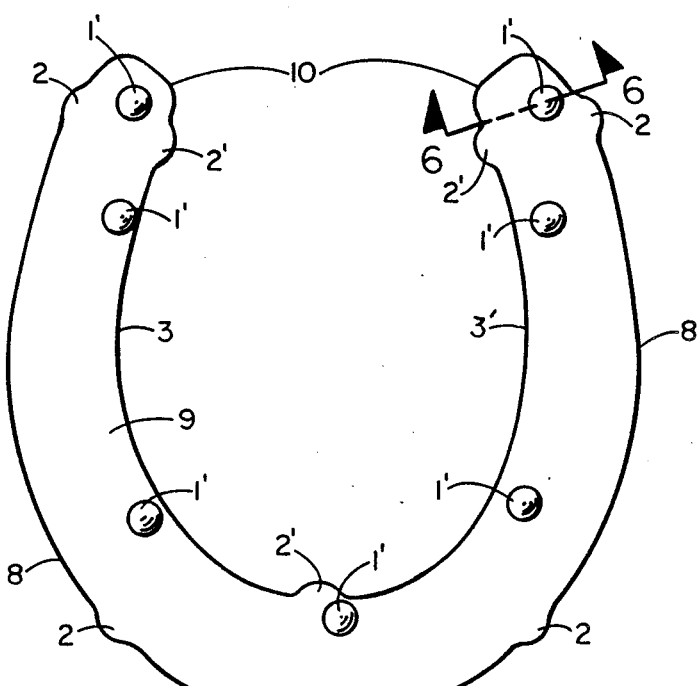
FIG. 2—Hoof side of core of horseshoe.

The inner edges of the core of horseshoe legs 3 and 3' are shown in FIGS. 1 and 2 and the inner edges 4 and 4' of the horseshoe legs 5 and 6 are shown in FIG. 7.

The buttons 1,1' and 2,2' above mentioned can be described as protrusions integrally molded on the surfaces and edges of the core 11 of the horseshoe.

This invention is to disclose a plastic molded horseshoe having a core segment of fiber reinforced polyurethane. For mounting on a horse hoof, the shoe described in this invention can be mounted in the standard and accepted way of using nails. The nails to be pounded through holes drilled in the shoe at points below the tread and caulk tops, and the nail head to bottom on the core segment 11. Holes are drilled in the shoe for mounting to accommodate various hooves.

As a further description of this invention, the molded plastic horseshoe of this invention has a horseshoe core segment 11, molded of polyurethane having 60% glass fiber and raised buttons 1,1', 2,2' on inner and outer edges and on hoof side 1' and earth side 1 of the core segment 11 and the core segment 11 encapsulated in neat polyurethane thermoplastic compound.

The term "encapsulated" is to mean encapsulating by means of plastic molding, thus the horseshoe is a double molding comprised of two different molding steps and compounds.

To encapsulate the core segment 11 the buttons 1,1', 2,2' serve to position and hold the core segment in the die while the neat polyurethane is formed, by molding around the core segment.

The caulks 13 on the heel of the double molded horseshoe, as well as the toe caulk and treads 14 are formed in the encapsulating die. The encapsulating die can be described the die holding the core segment 11 around which segment neat polyurethane is formed to encapsulate the core segment.

Double molding best describes the method of a first molding of a core segment 11 molded of 60% glass fiber in thermoplastic polyurethane, then placing this first molding of core segment in a die for molding of plastic in this case neat polyurethane to encapsulate the core segment, as the second step of this double molding method.

Where mention is made of glass in thermoplastic polyurethane, this means glass fiber.

Suppliers of polyurethane type of materials, suitable for encapsulation of the molded core segment as desctribed above, could be:

Estane #58122 compound
B F. Goodrich Co.
Chemical Group
6100 Oak Tree Blvd.
Clevaland, Ohio 44131

Texin #480A compound
Mobay Chemical Corp.
Polyurethane Division
Mobay Road
Pittsburg, Pa. 15205

Pellethane #2355 compound

Dow Chemical Company
2020 Dow Center
Midland, Mich. 48640

Figure 13:
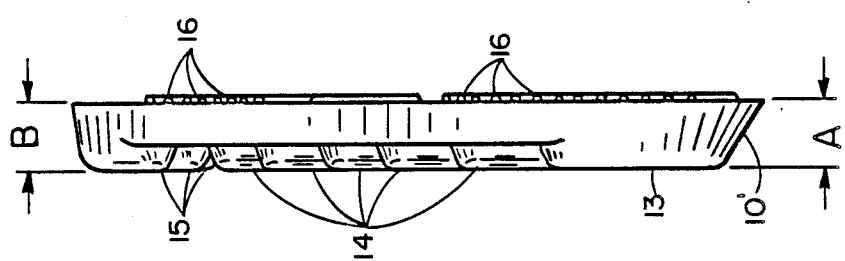
FIG. 13—Side elevation view of horseshoe.

As shown in FIG. 13, the thickness of the heel A is usually greater than the toe B of the horseshoe. The thickness of A and B can be varied by the molding die at the time of encapsulating the core.

LIST OF PARTS

Figure 3:
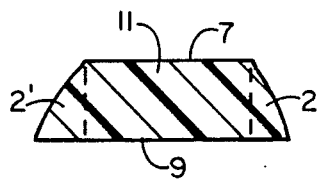
FIG. 3 (section 3-3 of FIG. 1)—Cross section of core of horseshoe showing the locating edge buttons.
Figure 4:
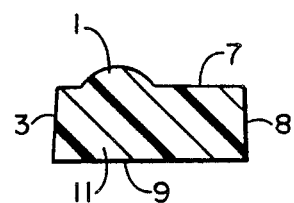
FIG. 4 (section 4-4 of FIG. 1)—Cross section or core of horseshoe showing molded die locating surface button on earth side of core.
Figure 5:
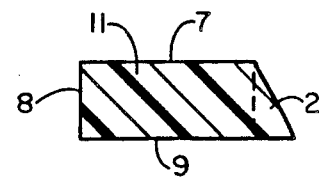
FIG. 5 (section 5-5 of FIG. 1)—Cross section of core of horseshoe showing die locating edge surface button on hoof side or core of horseshoe.
Figure 6:
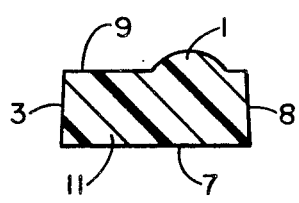
FIG. 6 (section 6-6 of FIG. 2)—Cross section of core of horseshoe showing molded die location surface button on hoof side of core of horseshoe.
Figure 12:
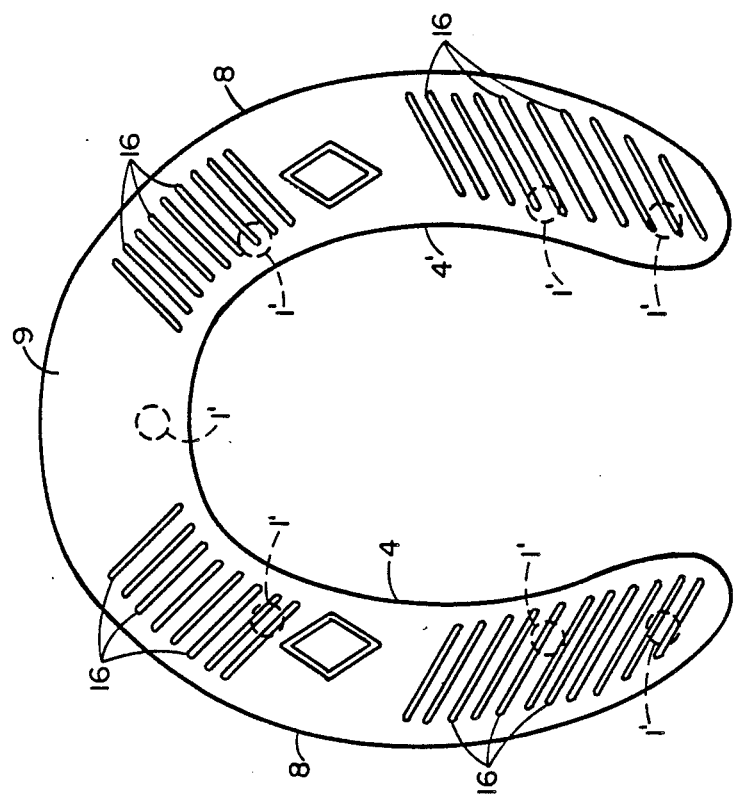
FIG. 12—Plan view of hoof side of double compound horseshoe.

FIG. 1—Earth side of core of double molded horseshoe
1—Raised buttons on earth side of horseshoe core
2,2'—Die locating buttons on edges of core of horseshoe
3,3'—Inner edge of core of horseshoe
7—Earth side of core of horseshoe
8—Outer edge of core of horseshoe
11—Core of horseshoe
10—Heel of core of horseshoe FIG. 2—Hoof side of core of horseshoe
1'—Raised buttons on hoof side of horseshoe core
2,2'—Die locating buttons on edges of core of horseshoe
3,3'—Inner edge of core of horseshoe
8—Outer edge of core of horseshoe
9—Hoof side of core of horseshoe
10—Heel of core of horseshoe FIG. 3—Cross section of core of horseshoe showing die locating edge buttons
2,2'—Die buttons on edges of core of horseshoe
7—Earth side of core of horseshoe
9—Hoof side of core of horseshoe
11—Molded core of horseshoe FIG. 4—Cross section of core of horseshoe showing molded die locating surface button on earth side of core
1—Raised buttons on earth side of horseshoe core
3—Inner edge of core of horseshoe
7—Earth side of core of horseshoe
8—Outer edge of core of horseshoe
9—Hoof side of core of horseshoe
11—Molded core of horseshoe FIG. 5—Cross section of core of horseshoe showing die locating edge surface button on hoof side of core
1—Raised buttons on earth side of horseshoe core
7—Earth side of core of horseshoe
8—Outer edge of core of horseshoe
9—Hoof side of core of horseshoe
2—Die button on outer edge of core of horseshoe
11—Molded core of horseshoe
8—Outer edge of molded core of horseshoe FIG. 6—Cross section of core of horseshoe showing molded die locating surface pimple on hoof side of core where:
1—Raised buttons on earth side or horseshoe core
3'—Inner edge of core of horseshoe
7—Earth side of core of horseshoe
8—Outer edge of molded core of horseshoe
9—Hoof side of core of horseshoe
11—Molded glass reinforced polyurethane core of horseshoe FIG. 7—Earth side of molded double compound horseshoe plan view of earth side wherein:
1—Raised buttons (ghost lines)
3,3'—Inner edge of molded core of horseshoe (ghost lines)
8—Outer edge of core of horseshoe (ghost lines)
10'—Heel of molded horseshoe
4,4'—Inner edge of horseshoe
13—Caulks on heel earth side of horseshoe
14—Tread segments on earth side of horseshoe
15—Toe caulk on earth side of horseshoe FIG. 8—Cross section elevation view at heel caulk of molded double compound horeseshoe wherein:
2—Die locating outer edge buttons
2'—Die locating innner edge buttons
7—Earth side of core
9—Hoof side of core
11—Molded glass reinforced polyurethane
12—Molded neat polyurethane
13—Caulk on heel of earth side of horseshoe
16—Corrugations on hoof side of horseshoe FIG. 9—Cross section elevation view at partial heel caulk of molded double compound horseshoe wherein:
1—Raised buttons on earth side of core
1'—Raised buttons on hoof side of core
3,3'—Inner edge of core of horseshoe (ghost lines)
7—Earth side of core of horseshoe
8—Outer edge of molded core of horseshoe
9—Hoof side of core of horseshoe
11—Core of horseshoe
12—Molded neat polyurethane
13—Caulk on heel of earth side of horseshoe FIG. 10—Cross section elevation view of mid portion caulk area of double compound horseshoe wherein:
7—Earth side of core of horseshoe
9—Hoof side of core of horseshoe
14—Tread segments on earth side of horseshoe
16—Corrugations on hoof side of horseshoe 11—Cross section elevation view of toe portion caulk area of double compound horseshoe wherein:
2'—Die locating inner edge button
7—Earth side of core of horseshoe
8—Outer edge of core of horseshoe
9—Hoof side of core of horseshoe
11—Core of horseshoe
12—Molded neat polyurethane
15—Toe caulks on earth side of horseshoe
16—Corrugations on hoof side of horseshoe FIG. 12—Plan view of hoof side of double compound horseshoe wherein:
1'—Ghost lines of raised buttons on hoof side of horseshoe core
4,4'—Inner edge of horseshoe
16—Corrugations on hoof side of horseshoe
8—Outer edge of horseshoe FIG. 13—Side elevation view of horseshoe wherein:
13—Caulk on heel of earth side of horseshoe
14—Tread segments on earth side of horseshoe
15—Toe caulk on earth side of horseshoe
16—Corrugations on hoof side of horseshoe
A—Thickness on heel of horseshoes B—Thickness on toe of horseshoe Having described the preferred embodiments of my invention of a non-metallic open heel molded plastic horseshoe, I claim:

1. An article of manufacture consisting of a molded plastic horseshoe wherein the improvement comprises:
    a—a horseshoe core segment molded of 60% glass fiber thermoplastic polyurethane compound and
    b—raised buttons on inner and outer edges, and hoof side and earth side of said core segment and
    c—said horseshoe core segment encapsulated in clear polyurethane thermoplastic compound.

2. An article of manufacture consisting of a molded plastic horseshoe of claim 1, wherein the improvement comprises:
    a—said polyurethane compound having a flexural strength of about 59,500 pounds per square inch and
    b—caulks on the heels, and toe, and treads on the earth side of the horseshoe formed by the clear polyurethane encapsulating the said horseshoe core segment.

3. An article of manufacture consisting of a horseshoe wherein the improvement comprises:
    a—a horseshoe core segment molded of thermoplastic polyurethane compound containing 60% glass fiber and
    b—raised buttons integrally molded on earth side, hoof side and inner and outer edges of said horseshoe core segment and
    c—clear polyurethane encapsulating said horseshoe core segment and
    d—said clear polyurethane forming heel caulks, toe caulk and treads on the earth side of the legs of the horseshoe.

* * * * *